(12) United States Patent
Ikegame et al.

(10) Patent No.: US 6,373,811 B1
(45) Date of Patent: Apr. 16, 2002

(54) OPTICAL PICK-UP APPARATUS

(75) Inventors: Tetsuo Ikegame, Hachioji; Kenichi Onomura, Tanashi, both of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/239,433

(22) Filed: Jan. 28, 1999

(30) Foreign Application Priority Data

Feb. 2, 1998 (JP) ............................................. 10-021166

(51) Int. Cl.[7] ................................................ G11B 17/04
(52) U.S. Cl. ...................................... 369/199; 369/179
(58) Field of Search .......................... 369/44.17, 44.19, 369/111, 112, 119, 199, 283, 284, 44.14, 44.11, 44.24, 44.23, 32, 112.17, 34, 36, 112.26, 178, 179

(56) References Cited

U.S. PATENT DOCUMENTS

| | | | | |
|---|---|---|---|---|
| 4,387,452 A | * | 6/1983 | Bricot et al. | 369/32 |
| 5,153,870 A | * | 10/1992 | Lee et al. | 369/11 |
| 5,255,560 A | * | 10/1993 | Yamada et al. | 369/199 |
| 5,420,848 A | * | 5/1995 | Date et al. | 369/112 |
| 5,793,731 A | * | 8/1998 | Lee et al. | 369/112 |

FOREIGN PATENT DOCUMENTS

| | | |
|---|---|---|
| JP | 2-206037 | 8/1990 |
| JP | 2-267741 | 11/1990 |
| JP | 3-25733 | 2/1991 |
| JP | 5-189796 | 7/1993 |
| JP | 5-189797 | 7/1993 |

OTHER PUBLICATIONS

Nikkei Electronics, Sep. 22, 1997, No. 699, pp. 13 and 14, published by Nikkei Business Publications, Inc., Japan.

Nikkei Byte, Sep., 1997, pp. 148–151, published by Nikkei Business Publications, Inc., Inc. Japan.

* cited by examiner

*Primary Examiner*—David Hudspeth
*Assistant Examiner*—Kim-Kwok Chu
(74) *Attorney, Agent, or Firm*—Frishauf, Holtz, Goodman, Langer & Chick, P.C.

(57) ABSTRACT

An optical pick-up apparatus according to the invention optically performs at least one of selective recording of information onto a plurality of recording layers of a plurality of optical recording mediums arranged in layers, and selective reproduction of information from the plurality of recording layers. Switching in optical circuits which are each adapted to guide a light beam to a desired recording layer is performed using a movable mirror, a galvano mirror or a biaxial movable mirror, to thereby perform selective recording of information onto the plurality of recording layers of optical disks or selective reproduction of information from the plurality of recording layers.

7 Claims, 9 Drawing Sheets

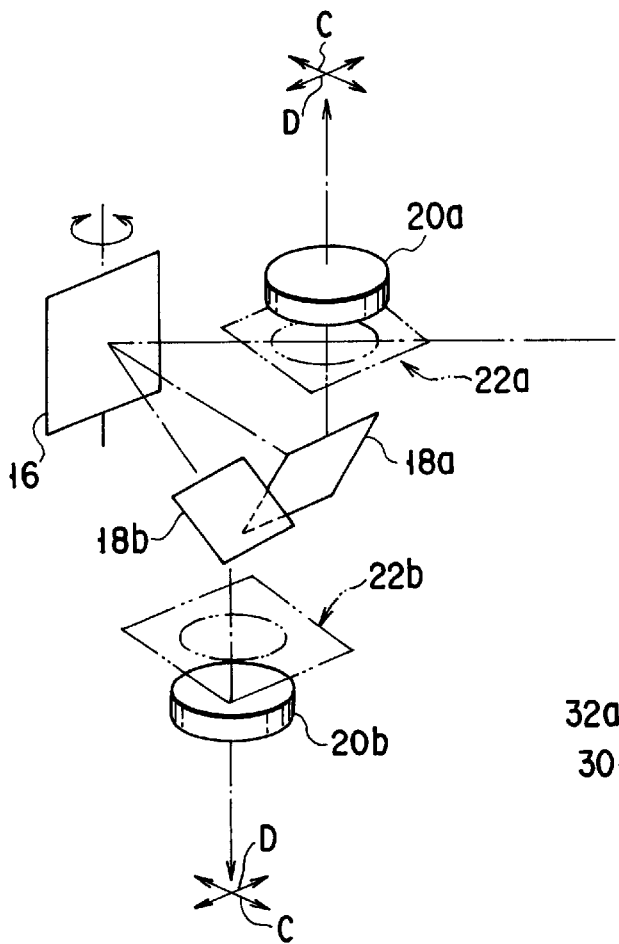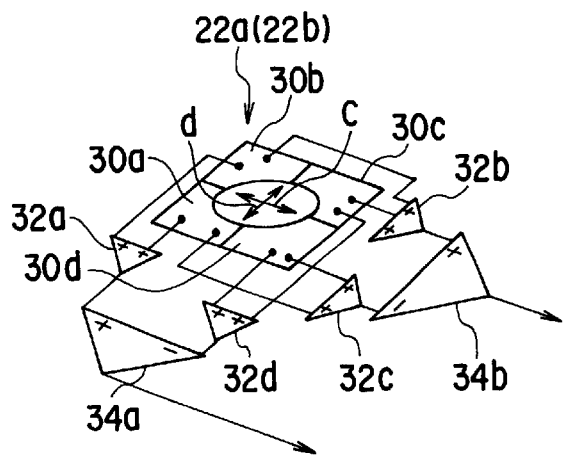
FIG. 3A　　　　　　　FIG. 3B
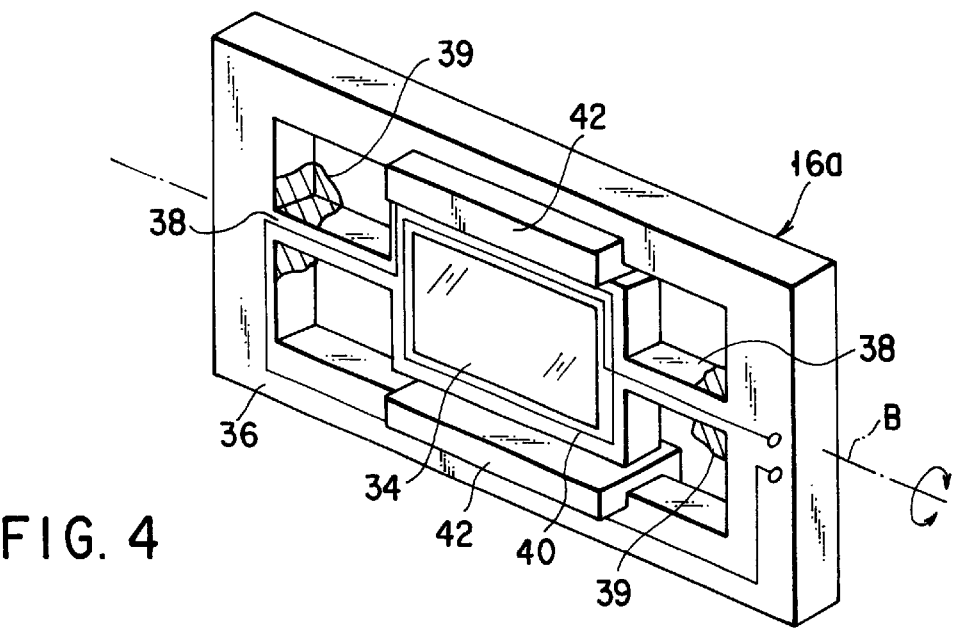
FIG. 4

OPTICAL PICK-UP APPARATUS

BACKGROUND OF THE INVENTION

This invention relates to an optical pick-up apparatus for optically performing at least one of selective recording of information onto a plurality of recording layers employed in an optical recording medium, and selective reproduction of information from the plurality of recording layers.

Optical pick-up apparatuses as above are known from, for example, Japanese Patent Application KOKAI Publications Nos. 5-189797 and 2-206037. When an optical pick-up apparatus disclosed in Japanese Patent Application KOKAI Publication No. 5-189797 optically performs at least one of recording of information onto a desired recording layer, and reproduction of information from the desired recording layer, optical beam emission means itself is inclined or moved parallel in order to radiate the desired recording layer with a light beam. Further, when an optical pick-up apparatus disclosed in Japanese Patent Application KOKAI Publication No. 2-206037 optically performs at least one of recording of information onto a desired recording layer, and reproduction of information from the desired recording layer, a beam splitter or a shielding plate is used in order to radiate the desired recording layer with a light beam, and light reflected from the desired r recording layer is guided by another beam splitter or a prism to a reflected-light detecting unit corresponding to the desired recording layer.

In the first-mentioned conventional optical pick-up apparatus, the structure for inclining or parallel-moving the optical beam emission means itself is very large and complicated. Accordingly, the optical pick-up apparatus is complicated in structure, and its entire body is inevitably large and heavy.

Also, in the second-mentioned conventional optical pick-up apparatus, the structure for combining the beam splitter, the shielding plate and the prism is very large and complicated. As a result, the optical pick-up apparatus is complicated in structure, which increases its manufacturing cost.

This invention has been derived from these circumstances, and an object of this invention is to provide an optical pick-up apparatus which h is small in scale, simple in structure and low in cost, which optically performs at least one of selective recording of information onto a plurality of recording layers employed in an optical recording medium, and selective reproduction of information from the plurality of recording layers.

BRIEF SUMMARY OF THE INVENTION

In order to achieve the above-described object of the present invention, a first optical pick-up apparatus, according to the invention, which optically performs at least one of selective recording of information onto a plurality of recording layers of an optical recording medium, and selective reproduction of information from the plurality of recording layers, performs switching in optical circuits which are each adapted to guide a light beam to a desired recording layer, using a movable mirror, to thereby perform selective recording of information onto the plurality of recording layers of the optical recording medium or selective reproduction of information from the plurality of recording layers.

In order to achieve the above-described object of the present invention, a second optical pick-up apparatus, according to the invention, which optically performs at least one of selective recording of information onto a plurality of recording layers of a plurality of optical recording mediums arranged in layers, and selective reproduction of information from the plurality of recording layers, performs switching in optical circuits which are each adapted to guide a light beam to a desired recording layer, using a movable mirror which is movable in a direction of alignment of the optical recording mediums, to thereby perform selective recording of information onto the plurality of recording layers of the optical recording mediums or selective reproduction of information from the plurality of recording layers.

In order to achieve the above-described object of the present invention, a third optical pick-up apparatus, according to the invention, which optically performs at least one of selective recording of information onto a plurality of recording layers of an optical recording medium, and selective reproduction of information from the plurality of recording layers, performs switching in optical circuits which are each adapted to guide a light beam to a desired recording layer, and guiding of the light beam to a desired recording track on the desired recording layer, using galvano mirrors, to thereby perform selective recording of information onto the plurality of recording layers or selective reproduction of information from the plurality of recording layers.

The galvano mirrors have a simple structure and can be controlled with high accuracy.

In order to achieve the above-described object of the present invention, in a fourth optical pick-up apparatus, according to the invention, which optically performs at least one of selective recording of information onto a plurality of recording layers of a plurality of optical recording mediums arranged in layers, and selective reproduction of information from the plurality of recording layers, a plurality of reflection mirrors corresponding to the plurality of recording layers of the plurality of optical recording mediums are provided such that they are separated from each other in a direction of alignment of the plurality of optical recording mediums and in a direction parallel to the surfaces of the optical recording mediums; switching in optical circuits each adapted to guide a light beam to that one of the reflection mirrors arranged in the direction parallel to the surfaces, which corresponds to a desired recording layer, is performed using a movable mirror to thereby perform, via the plurality of reflection mirrors, selective recording of information onto the plurality of recording layers of the optical recording mediums or selective reproduction of information from the plurality of recording layers. The corresponding reflection mirror included in the plurality of reflection mirrors arranged in the direction parallel to the surfaces is adapted, if necessary, to further guide the light beam to that one of the reflection mirrors separated in the direction of alignment, which corresponds to a desired recording layer.

In order to achieve the above-described object of the present invention, in a fifth optical pick-up apparatus, according to the invention, which optically performs at least one of selective recording of information onto a plurality of recording layers provided on optical recording mediums and separated from each other in a direction perpendicular to the surfaces of the optical recording mediums, and selective reproduction of information from the plurality of recording layers, a light beam is entered in a direction parallel to the surfaces of the optical recording mediums for performing selective recording of information onto the plurality of recording layers separated in the direction perpendicular to the surfaces or selective reproduction of information from the plurality of recording layers.

Making a light beam to be entered in a direction parallel to the surfaces of the optical recording mediums as described above enables reduction of the size of the optical pick-up apparatus in a direction perpendicular to the surfaces of the optical recording mediums.

In order to achieve the above-described object of the present invention, a sixth optical pick-up apparatus, according to the invention, which optically performs at least one of selective recording of information onto a plurality of recording layers of a plurality of optical recording mediums arranged in layers, and selective reproduction of information from the plurality of recording layers, performs switching in optical circuits which are each adapted to guide a light beam to a desired recording layer, using a biaxial movable mirror, to thereby perform selective recording of information onto the plurality of recording layers of the optical recording mediums or selective reproduction of information from the plurality of recording layers.

The use of the biaxial movable mirror not only enables execution of at least one of selective recording of information onto a plurality of recording layers of a single optical recording medium, and selective reproduction of information from the plurality of recording layers, but also enables simplification of the structure of an optical circuit which can perform at least one of selective recording of information onto a plurality of recording layers of a plurality of optical recording mediums arranged in layers, and selective reproduction of information from the plurality of recording layers.

In order to achieve the above-described object of the present invention, a seventh optical pick-up apparatus, according to the invention, which optically performs at least one of selective recording of information onto a plurality of recording layers of a plurality of optical recording mediums arranged in layers, and selective reproduction of information from the plurality of recording layers, performs switching in optical circuits which are each adapted to:guide a light beam to a desired recording layer, using a biaxial movable mirror which can be inclined in a direction of alignment of the plurality of optical recording mediums and in a direction parallel to the surfaces of the optical recording mediums to thereby perform selective recording of information onto the plurality of recording layers of the optical recording mediums or selective reproduction of information from the plurality of recording layers.

The use of the biaxial movable mirror which can be inclined in both the direction of alignment and the direction parallel to the surfaces, not only enables execution of at least one of selective recording of information onto a plurality of recording layers of a single optical recording medium and selective reproduction of information from the plurality of recording layers, but also permits the structure of an optical circuit to be made compact, which circuit can perform at least one of selective recording of information onto a plurality of recording layers of a plurality of optical recording mediums arranged in layers, and selective reproduction of information from the plurality of recording layers.

In order to achieve the above-described object of the present invention, in an eighth optical pick-up apparatus, according to the invention, which optically performs at least one of selective recording of information onto a plurality of recording layers of a plurality of optical recording mediums arranged in layers, and selective reproduction of information from the plurality of recording layers, a plurality of reflection mirrors corresponding to the plurality of recording layers of the plurality of optical recording mediums are provided such that they are separated from each other in a direction of alignment of the plurality of optical recording mediums and in a direction parallel to the surfaces of the optical recording mediums. Switching in optical circuits which are each adapted to guide a light beam to that one of the reflection mirrors arranged in the direction parallel to the surfaces, which corresponds to a desired recording layer, is performed using a movable mirror to thereby perform, via the plurality of reflection mirrors, selective recording of information onto the plurality of recording layers of the optical recording mediums or selective reproduction of information from the plurality of recording layers; and the corresponding reflection mirror included in the plurality of reflection mirrors arranged in the direction parallel to the surfaces is adapted, if necessary, to further guide the light beam to that one of the reflection mirrors separated in the direction of alignment, which corresponds to a desired recording layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiment given below, serve to explain the principles of the present invention in which:

FIG. 3A is an enlarged perspective view illustrating the optical circuit of an optical head incorporated in the optical pick-up apparatus of FIG. 1;

FIG. 3B is a schematic enlarged view of a quartered detector appearing in FIG. 3A;

FIG. 4 is a schematic enlarged view showing a galvano mirror, a kind of movable mirror, employed in the optical pick-up apparatus of FIG. 1;

Optical pick-up apparatuses according to: various embodiments of the invention will be described in detail with reference to the accompanying drawings.

DETAILED DESCRIPTION OF THE INVENTION

First Embodiment

Referring first to FIGS. 1 to 4 included in the accompanying drawings, an optical pick-up apparatus according to a first embodiment of the invention will be described.

Figure 1:
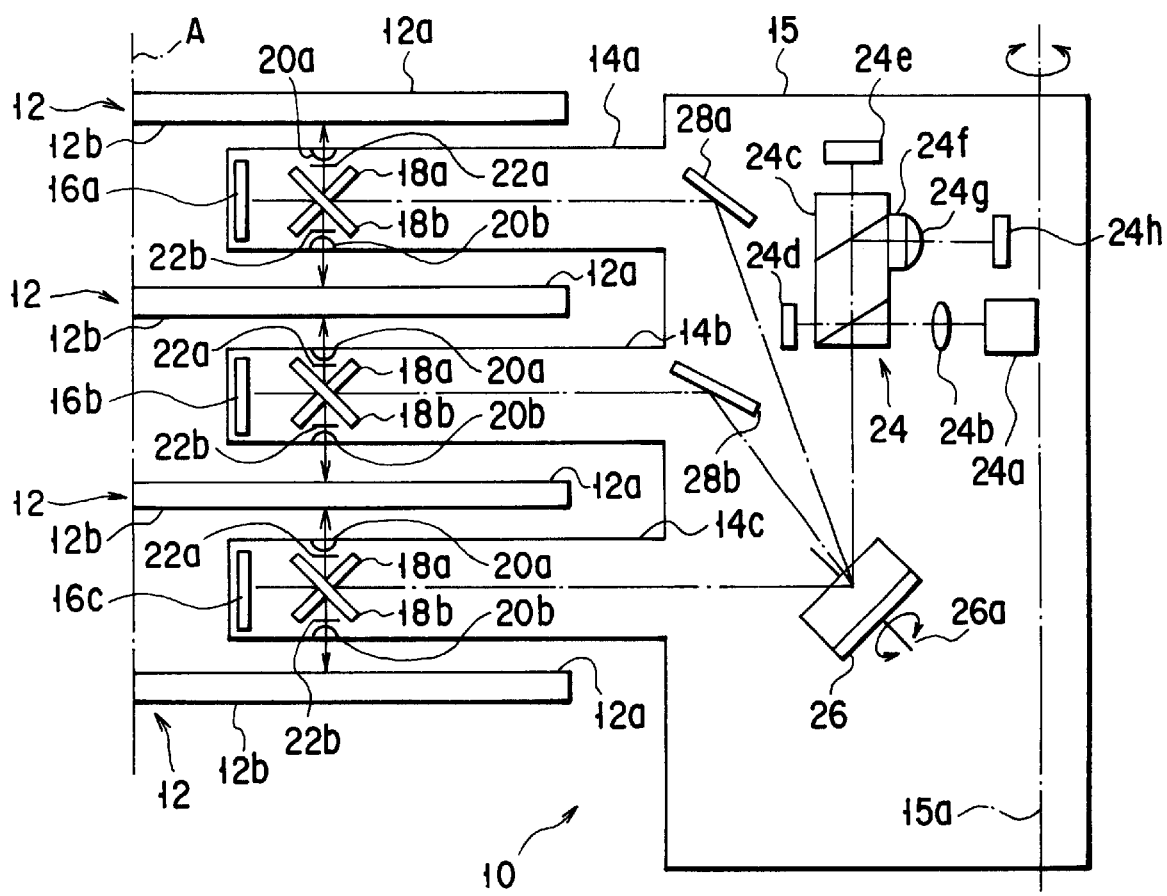
FIG. 1 is a schematic longitudinal sectional view illustrating an optical pick-up apparatus according to a first embodiment of the invention.
Figure 2:
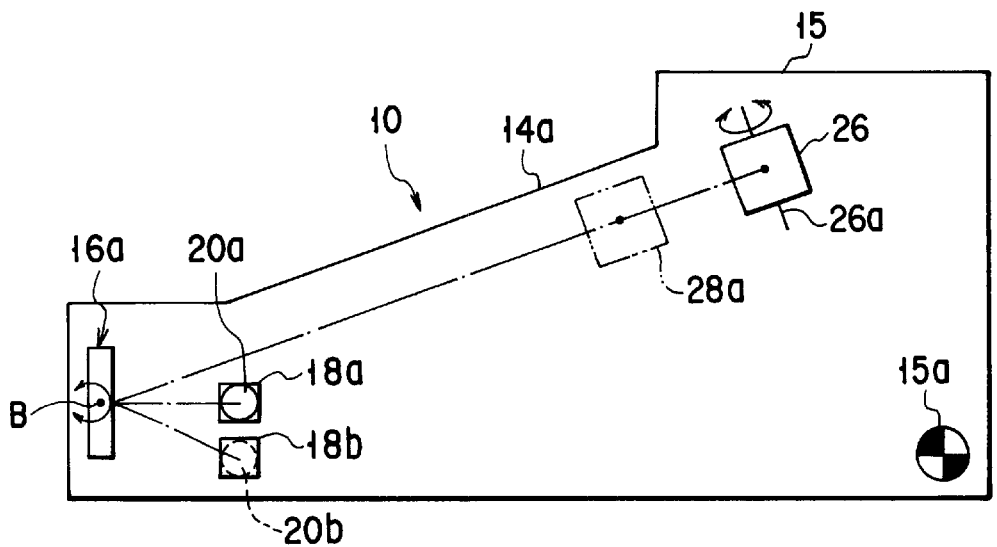
FIG. 2 is a schematic horizontal sectional view illustrating the optical pick-up apparatus of FIG. 1.

FIG. 1 is a schematic longitudinal sectional view illustrating an optical pick-up apparatus 10 according to the first embodiment of the invention; and. FIG. 2 is a schematic horizontal sectional view illustrating the optical pick-up apparatus 10 of FIG. 1.

The optical pick-up apparatus 10 is disposed adjacent to a plurality of optical disks 12, which are arranged concentric with each other in the form of layers. The optical disks 12 can be rotated at a predetermined speed in a predetermined direction by means of driving means (not shown). Each of the optical disks 12 has recording layers 12a and 12b respectively provided on both surfaces thereof which are directed opposite to each other along the axis-of-rotation A of the disks.

The optical pick-up apparatus 10 can swing within a predetermined range about an axis-of-rotation 15a which extends parallel to the axis-of-rotation A of the optical disks 12 in the vicinity of the edges of the optical disks 12. The apparatus 10 has a main body housing 15 having arm members 14a, 14b and 14c corresponding to gaps defined between adjacent optical disks 12.

When the main body housing 15 of the optical pick-up apparatus is swung about the axis-of-rotation 15a by publicly-known swinging means, extended end portions of the arm members 14a, 14b and 14c are swung along the surfaces of the optical disks 12. At this time, the extended end portions of the arm members 14a, 14b and 14c are swung between those portions of the optical disks 12 which are in the vicinity of the axis-of-rotation A of the optical disks 12, and edge portions of the optical disks 12, and between an operative position in which each of the extended end portions is opposed to the recording layers 12a and 12b of the optical disks 12, and an operation stop position in which the extended end portions are placed outside the edges of the optical disks 12.

Galvano mirrors 16a, 16b and 16c each having an axis-of-rotation B parallel to the axis-of-rotation A of the optical disks 12 are arranged in the extended end portions of the arm members 14a, 14b and 14c. In each of the extended end portions of the arm members 14a, 14b and 14c, a pair of stationary mirrors 18 and 18b are provided at that portion of the extended end portion which is closer to the proximal end of the arm member 14a, 14b or 14c than the corresponding:galvano mirror 16a, 16b or 16c.

The pair of stationary mirrors 18a and 18b are separated from each other in a direction along the recording layers 12a and 12b of each optical disks 12 and along recording tracks (not shown) which circumferentially extend in each of the recording layers 12a and 12b, and are inclined in different directions to the recording layers 12a and 12b.

Objective lenses 20a and 20b are provided in each of the extended end portions of the arm members 14a, 14b and 14c between a corresponding pair of stationary mirrors 18a, 18b and the recording layers 12a and 12b of a corresponding pair of adjacent optical disks 12 opposed to the stationary mirrors.

The galvano mirror 16a, 16b or 16c, the pair of stationary mirrors 18a and 18b and the objective lenses 20a and 20b in one of the extended end portions of the arm members 14a, 14b and 14c are aligned with corresponding elements in another extended end portion along the axis-of-rotation A of the optical disks 12.

Further, as is shown in FIG. 3A which is an enlarged view of an optical circuit provided in each of the extended end portions of the arm members 14a, 14b and 14c, each of the extended end portions of the arm members 14a, 14b and 14c also contains a pair of quartered detectors 22a and 22b between the pair of stationary mirrors 18a and 18b and the pair of objective lenses 20a and 20b.

The optical pick-up apparatus 10 includes a light beam emitting/receiving unit 24 of a publicly-known structure in the main body housing 15 in the vicinity of the axis-of-rotation 15a. In this embodiment, the light beam emitting/receiving unit 24 has a laser diode 24a as a light source. A laser beam emitted from the laser diode 24a is guided to a beam splitter formed of a prism assembly 24c via a collimate lens 24b, where it is split into two beams. One of the two beams is guided to a photodetector 24d for detecting the intensity of light, while the other is guided downward parallel to the axis-of-rotation 15a.

The optical pick-up apparatus 10 includes a movable mirror 26 with inclined-angle detecting means 25 located below the light beam emitting/receiving unit 24 in a position corresponding to the lowest arm member 14c, and also includes stationary mirrors 28a and 28b located at proximal ends of the arm members 14a and 14b respectively, which are located above the lowest arm member 14c. The mirror surfaces of the stationary mirrors 28a and 28b are directed obliquely downward.

In this embodiment, the movable mirror 26 consists of a galvano mirror having an axis-of-rotation 26a parallel to the recording layers 12a and 12b of the optical disks 12. When the movable mirror 26 swings about the axis-of-rotation 26a along the axis-of-rotation A of the optical disks 12 to thereby incline, it selectively reflects a laser beam guided downward from the light beam emitting/receiving unit 24, to one of the galvano mirror 16c located in the extended end portion of the lowest arm member 14c, and the stationary mirrors 28a and 28b located at the proximal ends of the arm members 14a and 14b located above the lowest arm member 14c.

The laser beam having entered the stationary mirror 28a or 28b of the upper arm member 14a or 14b is reflected by the mirror 28a or 28b to the galvano mirror 16a or 16b located in the extended end portion of the arm members 14a or 14b located above.

When as described above, the laser beam is selectively guided to any of the galvano mirrors 16a, 16b and 16c in the extended end portions of the arm members 14a, 14b and 14c, the galvano mirror 16a, 16b or 16c selectively swings about the axis-of-rotation B parallel to the axis-of-rotation A of the optical disks 12, thereby reflecting it to one of a corresponding pair of the inclined stationary mirrors 18a and 18b. The stationary mirror 18a or 18b which the laser beam has entered reflects it to a corresponding objective lens 20a or 20b via a corresponding quartered detector 22a or 22b. The objective lens 20a or 20b which the laser beam has entered guides the laser beam to a corresponding recording layer 12a or 12b of a corresponding optical disk 12 to record information onto the corresponding recording layer 12a or 12b, or to reproduce information from the corresponding recording layer 12a or 12b.

In each of the arm members 14a, 14b and 14c, it is preferable that the optical path length from the light beam emitting/receiving unit 24 to the recording layer 12a or 12b via the corresponding objective lens 20a or 20b, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the light beam emitting/receiving unit 24 can have the same optical characteristics.

A laser beam reflected from the recording layer 12a or 12b is guided to the light beam emitting/receiving unit 24, passing through the same optical path as above but in the opposite direction. The reflected laser beam having entered the light beam emitting/receiving unit 24 is split by the beam splitter of the prism assembly 24c. Part of the split, reflected laser beam is guided to a photodetector 24e for servo, while the other of the split, reflected laser beam is divided into two deflected beam components by a Wollaston prism 24f and then enters, via a lens 24g, a photodetector 24h for detecting a reflected light signal.

As clearly shown in FIG. 3B, each of the quartered detectors 22a and 22b comprises publicly-known four photodetectors 30a, 30b, 30c and 30d combined annular, four adders 32a, 32b, 32c and 32d each connected to a corresponding pair of adjacent photodetectors 30a, 30b, 30c and 30d, and a pair of differential amplifiers 34a and 34b each connected to a corresponding pair of the adders 32a, 32b, 32c and 32d.

Each of the quartered detectors 22a and 22b detects that a laser beam, which should be emitted, after passing through a central aperture surrounded by the four photodetectors 30a, 30b, 30c and 30d, from a corresponding objective lens 20a or 20b onto a desired recording track included in multiple recording tracks (not shown) which extend circumferentially on a corresponding recording layer 12a or 12b of a corresponding optical disk 12, deviates in a radial tracking direction C of the optical disk 12 or in a tangential direction D parallel to the circumferential direction.

After detecting deviation in the tangential direction D, each of the four quartered detectors 22a and 22b controls, together with the inclined-angle detecting means 25 of the movable mirror 26, the inclined angle of the movable mirror 26 and also the inclined angle of the galvano mirror 16a, 16b, 16c or 16d, so that the laser beam will always follow the desired track of the recording layer 12a or 12b. After detecting deviation in the tracking direction C, each of the four quartered detectors 22a and 22b controls, together with the inclined-angle detecting means 25 of the movable mirror 26, the inclined angle of the movable mirror 26 and also the inclined angle of the galvano mirror 16a, 16b, 16c or 16d, so that information can be correctly recorded onto a desired track using the laser beam, or can be correctly reproduced from a desired track.

The quartered detectors 22a and 22b detect, on the basis of the sum of the outputs of the adders 32a and 32b, whether the laser beam enters the combination of the stationary mirror 18a and the objective lens 20a, or the combination of the fixed lens 18b and the objective lens 20b, and accordingly detect whether the laser beam enters the recording layer 12a or 12b which corresponds to the objective lens 20a or 20b.

The detection results of the quartered detectors 22a and 22b are input to driving means (not shown) for driving the movable mirror 26. On the basis of the detection results, the driving means not shown prevents deviation in the tracking direction C, i.e. in the radial direction of each optical disk 12, of the laser beam to be converged via the objective lens 20a or 20b onto a desired track included in multiple recording tracks (not shown) which extend circumferential on the recording layer 12a or 12b of the disk 12, or prevents deviation of the laser beam in the tangential direction D, i.e. in the circumferential direction of the disk. Thus, defective recording and reproduction of information can be avoided.

FIG. 4 roughly shows the structure of a galvano mirror 16a as a representative of the galvano mirrors 16a, 16b and 16c located in the extended end sections of the arm members 14a, 14b and 14c and the movable mirror 26. The other galvano mirrors 16b and 16c have the same structure and size as the galvano mirror 16a, while the movable mirror 26 has the same structure as the galvano mirror 16a although they have different sizes.

The galvano mirror 16a comprises a mirror support member 34, an outer frame 36 which surrounds the mirror support member 34, and a pair of bridge members 38 which coaxially bridge the mirror support member 34 and the outer frame 36 and constitutes the axis-of-rotation B. The mirror support member 34, the outer frame 36 and the pair of bridge members 38 are formed integral as one body.

A damping material 39 is adhered to a connecting portion of the outer frame 36 and each of the bridge members 38. A coil 40 is wound on the mirror support member 34, while a pair of magnets 42 are fixed on the outer frame 36 in a direction perpendicular to the direction in which the pair of bridge members 38 extend such that they are opposed to the mirror support member 34.

The direction and angle of the mirror support member 34 which swings about the axis-of-rotation B can be controlled by controlling the direction and intensity of a current flowing through the coil 40.

In the above-described optical pick-up apparatus 10 of the first embodiment, a laser beam emitted from the light emitting/receiving unit 24 is selectively guided, by the movable mirror 26 opposed to the light beam emitting/receiving unit 24, to an optical path directed to the galvano mirror 16a in one of the extended end portions of the arm members 14a, 14b and 14c. The galvano mirror 16a in each of the extended end portions of the arm members 14a, 14b and 14c directs the incident laser beam to that one of the objective lenses 20a and 20b which corresponds to and is opposed to a desired one of the recording layers 12a and 12b, and then to the desired recording layer.

Second Embodiment

Figure 5A:
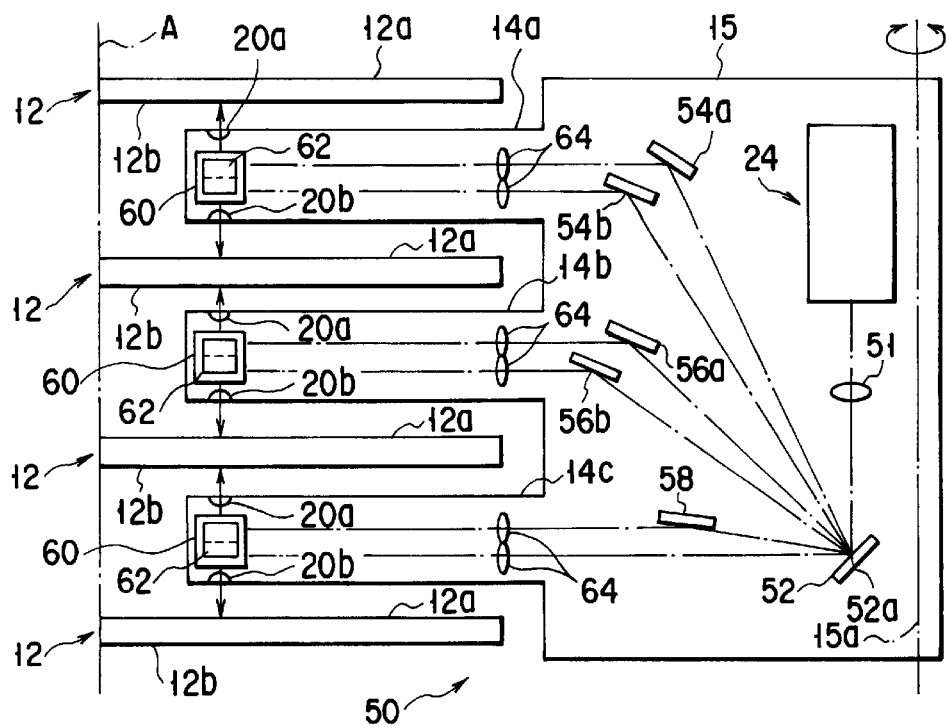
FIG. 5A is a schematic longitudinal sectional view illustrating an optical pick-up apparatus according to a second embodiment of the invention.
Figure 5B:
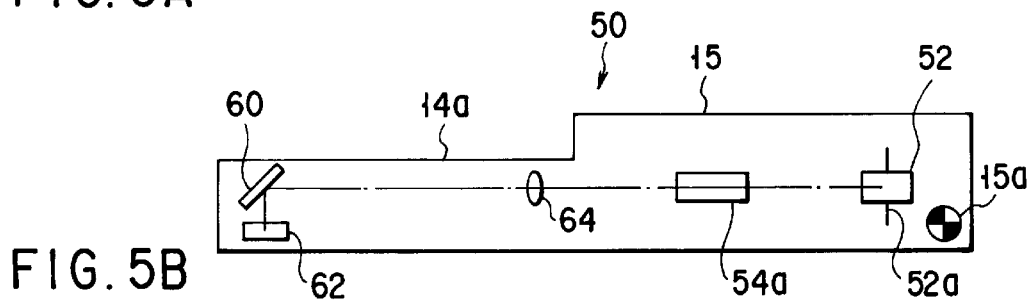
FIG. 5B is a schematic horizontal sectional view illustrating the optical pick-up apparatus of FIG. 5A.

FIG. 5A is a schematic longitudinal sectional view illustrating an optical pick-up apparatus 50 according to a second embodiment of the invention; and FIG. 5B is a schematic plan view illustrating the optical pick-up apparatus 50 of FIG. 5A according to the second embodiment.

In the second embodiment, structural elements similar to those employed in the first embodiment described with reference to FIGS. 1 to 4 are denoted by corresponding reference numerals, and no detailed description will be given thereof.

In this embodiment, a laser beam is downwardly emitted from the light beam emitting/receiving unit 24 and passes through a relay lens 51 in a manner parallel to the axis-of-rotation 15a of the main body housing 15. This laser beam is reflected, by a galvano mirror 52 located corresponding to the lowest arm member 14c, to one of two pairs of stationary mirrors 54a, 54b, 56a and 56b located corresponding to the proximal ends of the arm members 14a and 14b above the lowest arm member 14c, or to a single stationary mirror 58 located corresponding to the proximal end of the lowest arm member 14c, or horizontally to the proximal end of the lowest arm member 14c.

The two pairs of stationary mirrors 54a, 54b, 56a and 56b and the single stationary mirror 58 are directed obliquely downward.

The galvano mirror 52 can swing about an axis-of-rotation 52a parallel to the recording layers 12a and 12b of each of a plurality of optical disks 12, and along the axis-of-rotation A of the optical disks 12. The stationary mirrors 54a and 54b (or the stationary mirrors 56a and 56b) located corresponding to the proximal ends of the arm member 14a (or 14b) above the lowest arm member 14c are separated from each other by a predetermined distance along the axis-of-rotation A. The stationary mirror 58 located corresponding to the proximal end of the lowest arm member 14c is upwardly separated, by a predetermined distance along the axis-of-rotation A, from the optical path of the laser beam horizontally reflected by the galvano mirror 52 into the lowest arm member 14c.

In each of the extended end portions of the arm members 14a, 14b and 14c, there are provided a stationary mirror 60 inclined sideways, and a prism 62 of a triangular cross section having a single ridge opposed to the stationary mirror 60. The ridge of the prism 62 extends parallel to the recording layers 12a and 12b on the opposite surfaces of each optical disk 12.

Figure 5C:
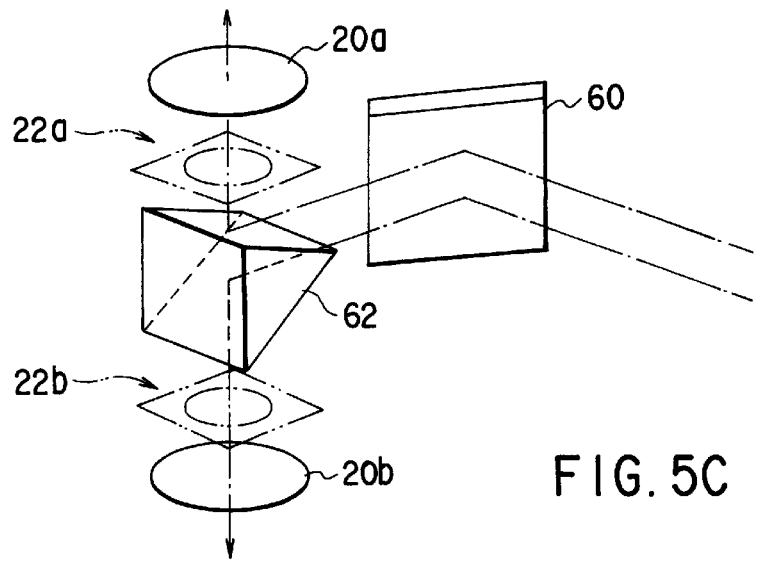
FIG. 5C is an enlarged perspective view illustrating the optical circuit of an optical head incorporated in the optical pick-up apparatus of FIG. 5A.

FIG. 5C is an enlarged view roughly showing the optical system located in each of the extended end portions of the arm members 14a, 14b and 14c.

The laser beam, which is reflected from the galvano mirror 52 to one of the two pairs of stationary mirrors 54a, 54b, 56a and 56b located corresponding to the proximal ends of the arm members 14a and 14b above the lowest arm member 14c, or to the single stationary mirror 58 located corresponding to the proximal end of the lowest arm member 14c, or horizontally to the proximal end of the lowest arm member 14c, enters the inclined stationary mirror 60 located in the extended end portion of a corresponding one of the arm members 14a, 14b and 14c, via a corresponding imaging lens 64.

There are two optical paths through which the laser beam is guided from the galvano mirror 52 into each of the arm members 14a, 14b and 14c. A laser beams which passes through the upper optical path, is reflected from the inclined stationary mirror 60 to the upper inclined reflection surface of the prism 62, where it is upwardly guided, via the quartered detector 22a and the objective lens 20a, to the recording layer 12b on the lower surface of the optical disk 12 which is opposed to the lens 20a. A laser beam, which passes through the lower optical path, is reflected from the inclined stationary mirror 60 to the lower inclined reflection surface of the prism 62, where it is downwardly guided, via the quartered detector 22b and the objective lens 20b, to the recording layer 12a on the upper surface of the optical disk 12 which is opposed to the lens 20b.

In the above-described optical pick-up apparatus 50 of the second embodiment, a laser beam emitted from the light emitting/receiving unit 24 is selectively guided, by the movable mirror 52 opposed to the light beam emitting/receiving unit 24, to one of the two optical paths directed to the inclined stationary mirror 60 and the prism 62 in one of the extended end portions of the arm members 14a, 14b and 14c. The prism 62 directs the laser beam having its path selected, to that one of the objective lenses 20a and 20b which corresponds to and is opposed to a selected one of the recording layers 12a and 12b, and then to the selected recording layer 12a or 12b.

In this embodiment, the two upper and lower optical paths, which extend from the galvano mirror 52 opposed to the light beam emitting/receiving unit 24, to the inclined stationary mirror 60 via the proximal end of each of arm members 14a, 14b and 14c, have their directions vertically changed by the prism 62.

In the second embodiment, the shape of the housing main body 15 when seen in plan view, in particular, the shape of each of the arm members 14a, 14b and 14c when seen in plan view can be made smaller in a width direction perpendicular to the longitudinal direction, than in the above-described first embodiment where the vertical swinging of a laser beam in the extended end portion of each of the arm members 14a, 14b and 14c is performed using the galvano mirror 16a and a pair of inclined stationary mirrors 18 and 18b horizontally separated from each other, which are incorporated in the arm member 14a, 14b or 14c.

It is preferable also in this embodiment that the optical path length from the light beam emitting/receiving unit 24 to the recording layer 12a or 12b via the corresponding objective lens 20a or 20b, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the light beam emitting/receiving unit 24 can have the same optical characteristics.

Further, also in this embodiment, the inclined stationary mirror 60, the prism 62, the pair of quartered detectors 22a and 22b and the objective lenses 20a and 20b in one of the extended end portions of the arm members 14a, 14b and 14c are aligned with corresponding optical elements in another extended end portion along the axis-of-rotation A of the optical disks 12.

Third Embodiment

Figure 6A:
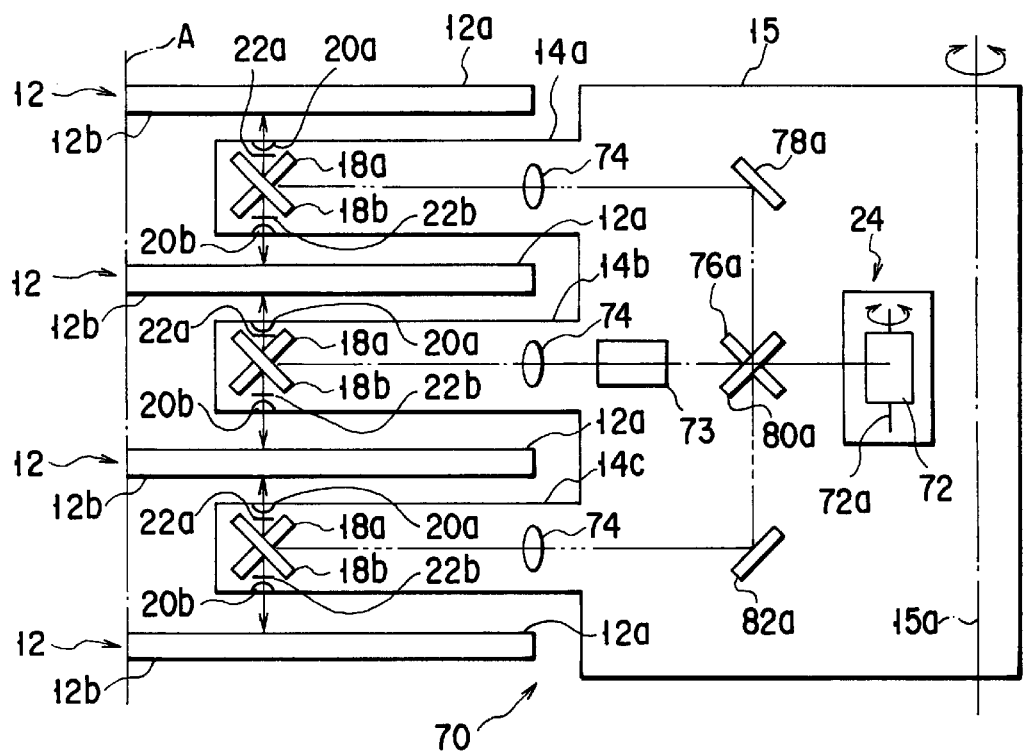
FIG. 6A is a schematic longitudinal sectional view illustrating an optical pick-up apparatus according to a third embodiment of the invention.
Figure 6B:
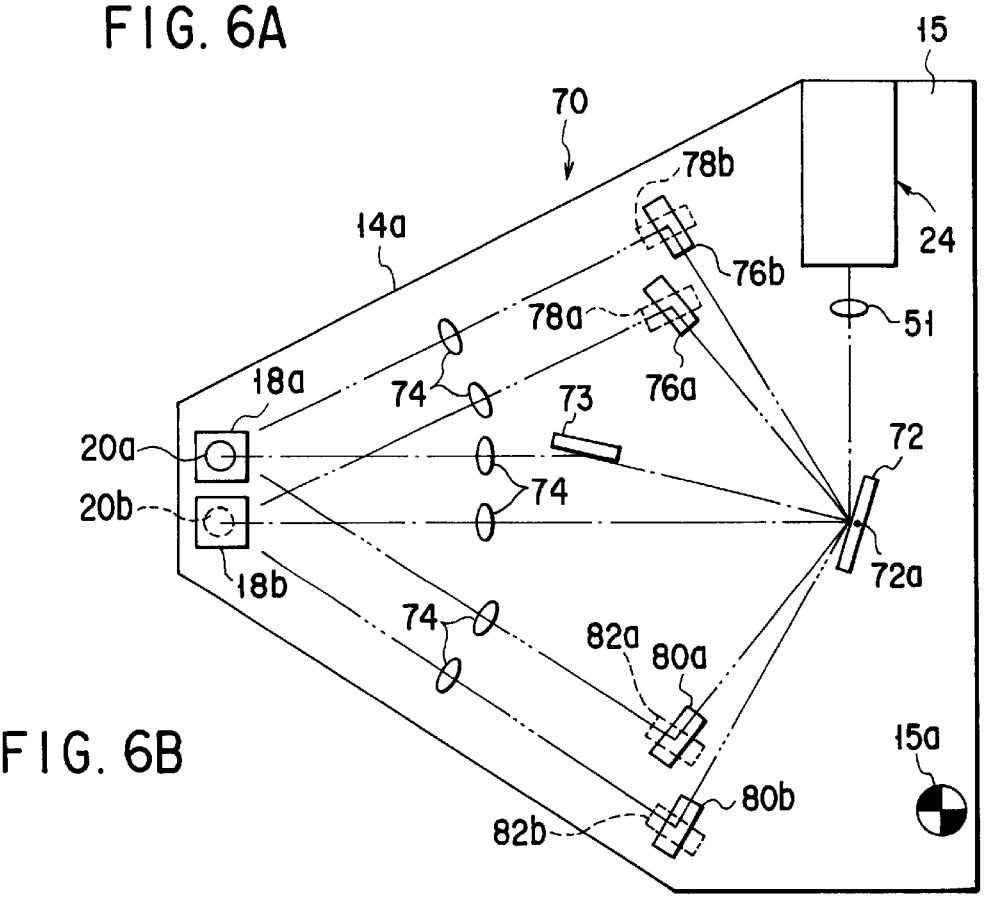
FIG. 6B is a schematic horizontal sectional view illustrating the optical pick-up apparatus of FIG. 6A.

FIG. 6A is a schematic longitudinal sectional view illustrating an optical pick-up apparatus 70 according to a third embodiment of the invention; and FIG. 6B is a schematic plan view illustrating the optical pick-up apparatus 70 of FIG. 6A according to the third embodiment.

In the third embodiment, structural elements similar to those employed in the first embodiment described with reference to FIGS. 1 to 4 are denoted by corresponding reference numerals, and no detailed description will be given thereof.

In this embodiment, a laser beam is emitted from the light beam emitting/receiving unit 24 in a substantially horizontal direction along the recording layers 12a and 12b of the optical disks 12. The horizontally emitted laser beam is directed to a galvano mirror 72 located at the same level as the proximal end of the arm member 14b which is the middle one of the arm members 14a, 14b and 14c. The galvano mirror 72 has an axis-of-rotation 72a extending parallel to the axis-of-rotation A of the optical disks 12, and is adapted to horizontally swing a laser beam from the light beam emitting/receiving unit 24.

The galvano mirror 72 selectively creates one of two optical paths which are directed to the extend end portion of the middle arm member 14b and horizontally separated from each other by a predetermined distance. One of the two optical paths directly linearly extends from the galvano mirror 72 to the extended end portion, while the other linearly extends to the extended end portion after being bent by a stationary mirror 73. When the laser beam from the galvano mirror 72 is guided through any one of the two optical paths, it passes through an imaging lens 74 and then reaches a corresponding one of a pair of inclined stationary mirrors 18a and 18b, which are horizontally located in the extended end portion of the arm member 14b with a predetermined distance therebetween. The pair of inclined stationary mirrors 18a and 18b incline in opposite directions. The corresponding one of the pair of inclined stationary mirrors 18a and 18b directs the laser beam to a corresponding one of the recording layers 12a and 12b of corresponding ones of the optical disks 12 via a corresponding one of the quartered detectors 22a and 22b and a corresponding one of the objective lenses 20a and 20b.

As shown in FIG. 6B, the galvano mirror 72 also selectively creates one of two optical paths which are directed to a pair of first stationary mirrors 76a and 76b located on one side of the proximal end of the middle arm member 14b in the horizontal direction. The pair of first stationary mirrors 76a and 76b are inclined upward for the upper arm member 14a.

A pair of second stationary mirrors 78a and 78b are arranged above the pair of first stationary mirrors 76a and 76b at the same level as the upper arm member 14a. The pair of second stationary mirrors 78a and 78b are inclined toward the extended end portion of the upper arm member 14a.

The laser beam reflected from the galvano mirror 72 and having entered one of the pair of first stationary mirrors 76a and 76b is guided by the one of the first stationary mirrors 76a and 76b to a corresponding one of the pair of second stationary mirrors 78a and 78b located above. The corresponding one of the pair of second stationary mirrors 78a and 78b directs the laser beam, via an imaging lens 74, to a corresponding one of a pair of inclined stationary mirrors 18a and 18b located in the extended end portion of the upper arm member 14a and horizontally separated from each other by a predetermined distance. The pair of inclined stationary mirrors 18a and 18b are inclined in opposite directions, and the corresponding one of the mirrors 18a and 18b directs the incident laser beam to a corresponding one of the recording layers 12a and 12b of corresponding ones of the optical disks 12 via a corresponding one of quartered detectors 22a and 22b and a corresponding one of objective lenses 20a and 20b.

As is shown in FIG. 6B, the galvano mirror 72 further selectively creates one of two optical paths which are directed to a pair of third stationary mirrors 80a and 80b located on the other side of the proximal end of the middle arm member 14b in the horizontal direction. The pair of third stationary mirrors 80a and 80b are inclined downward for the lower arm member 14c.

A pair of fourth stationary mirrors 82a and 82b are arranged below the pair of third stationary mirrors 80a and 80b at the same level as the lower arm member 14c. The pair of fourth stationary mirrors 82a and 82b are inclined toward the extended end portion of the lower arm member 14c.

The laser beam reflected from the galvano mirror 72 and having entered one of the pair of third stationary mirrors 80a and 80b is guided by the one of the third stationary mirrors 80a and 80b to a corresponding one of the pair of fourth stationary mirrors 82a and 82b located below. The corresponding one of the pair of fourth stationary mirrors 82a and 82b directs the laser beam, via an imaging lens 74, to a corresponding one of a pair of inclined stationary mirrors 18a and 18b located in the extended end portion of the lower arm member 14c and horizontally separated from each other by a predetermined distance. The pair of inclined stationary mirrors 18a and 18b are inclined in opposite directions, and the corresponding one of the mirrors 18a and 18b directs the incident laser beam to a corresponding one of the recording layers 12a and 12b of corresponding ones of the optical disks 12 via a corresponding one of quartered detectors 22a and 22b and a corresponding one of objective lenses 20a and 20b.

As described above, in this embodiment, a laser beam is guided by the single galvano mirror 72 to a desired one of the recording layers 12a and 12b of the optical disks 12 via a desired one of the objective lenses 20a and 20b of a desired one of the arm members 14a, 14b and 14c, as a result of only changing the swing angle of the single galvano mirror 72 and using the functions of the aforementioned plural stationary mirrors for the arm members 14a, 14b and 14c. Thus, information can be recorded onto or reproduced from a desired recording layer using a laser beam reflected from the single galvano mirror 72.

It is preferable also in this embodiment that the optical path length from the light beam emitting/receiving unit 24 to the recording layer 12a or 12b via the corresponding objective lens 20a or 20b included in each of the arm members 14a, 14b and 14c, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the. light beam emitting/receiving unit 24 can have the same optical characteristics.

Further, also in this embodiment, the pair of inclined stationary mirrors 18a and 18b, the pair of quartered detectors 22a and 22b and the objective lenses 20a and 20b in one of the extended end portions of the arm members 14a, 14b and 14c are aligned with corresponding optical elements in another extended end portion along the axis-of-rotation A of the optical disks 12.

Fourth Embodiment

Figure 7A:
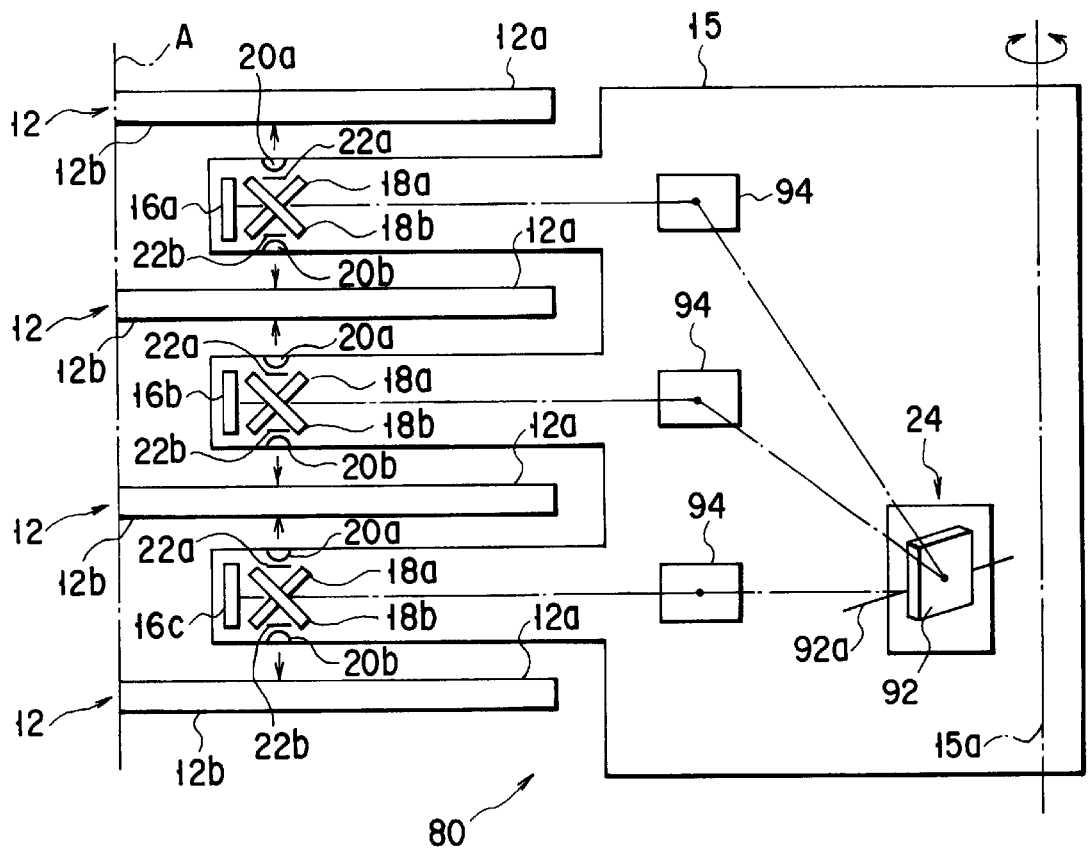
FIG. 7A is a schematic longitudinal sectional view illustrating an optical pick-up apparatus according to a fourth embodiment of the invention.
Figure 7B:
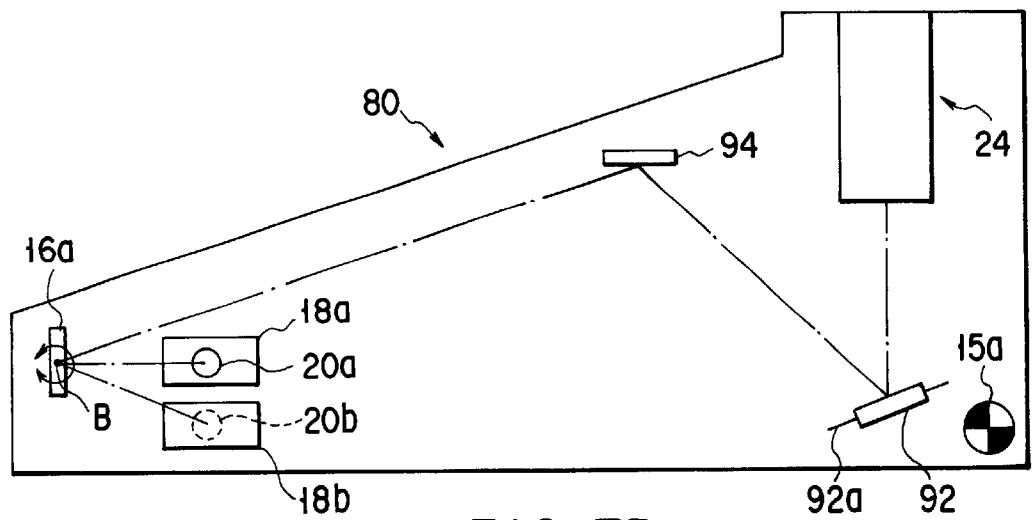
FIG. 7B is a schematic horizontal sectional view illustrating the optical pick-up apparatus of FIG. 7A.

FIG. 7A is a schematic longitudinal sectional view illustrating an optical pick-up apparatus 80 according to a fourth embodiment of the invention; and FIG. 7B is a schematic plan view illustrating the optical pick-up apparatus 80 of FIG. 7A according to the fourth embodiment.

In the fourth embodiment, structural elements similar to those employed in the first embodiment described with reference to FIGS. 1 to 4 are denoted by corresponding reference numerals, and no detailed description will be given thereof.

Also in this embodiment, a laser beam is emitted from the light beam emitting/receiving unit 24 in a substantially horizontal direction along the recording layers 12a and 12b of the optical disks 12. The horizontally emitted laser beam is directed to a movable mirror 92 located at the same level as the proximal end of the arm member 14c which is the lowest one of the arm members 14a, 14b and 14c. The movable mirror 92 has an axis-of-rotation 92a extending parallel to the horizontal direction, and is adapted to swing a laser beam from the light beam emitting/receiving unit 24 in the vertical direction along the axis-of-rotation A of the optical disks 12.

A plurality of stationary mirrors 94 directed horizontal are provided corresponding to the proximal ends of the arm members 14a, 14b and 14c. The movable mirror 92 selectively directs the laser beam to one of the stationary mirrors 94.

The one of the stationary mirrors 94 directs the laser beam to a corresponding one of galvano mirrors 16a, 16b and 16c located in the extended end portions of the arm members 14a, 14b and 14c, respectively. Each of the galvano mirrors 16a, 16b and 16c has an axis-of-rotation B parallel to the axis-of-rotation A of the optical disks 12. Each of the galvano mirrors 16a, 16b and 16c selectively swings about its axis-of-rotation B to thereby reflect the laser beam to one of a pair of stationary mirrors 18a and 18b inclined in opposite directions. That one of the stationary mirrors 18a and 18b which has received the laser beam reflects it to a corresponding one of objective lenses 20a and 20b via a corresponding one of quartered detectors 22a and 22b. The one of the objective lenses 20a and 20b which the laser beam enters guides it to a corresponding one of the recording layers 12a and 12b of corresponding ones of the optical disks 12, thereby recording information onto the corresponding recording layer 12a or 12b or reproducing information from the corresponding recording layer 12a or 12b.

It is preferable that the optical path length from the light beam emitting/receiving unit 24 to the recording layer 12a or 12b via the corresponding objective lens 20a or 20b included in each of the arm members 14a, 14b and 14c, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the light beam emitting/receiving unit 24 can have the same optical characteristics.

In the above-described optical pick-up apparatus 80 of the fourth embodiment, a laser beam emitted from the light emitting/receiving unit 24 is selectively guided, by the movable mirror 92 opposed to the light beam emitting/receiving unit 24, to the optical path directed to the galvano mirror 16a in the extended end portion of one of the arm members 14a, 14b and 14c. The galvano mirror 16a in the extended end portion of the one of the arm members 14a, 14b and 14c directs the incident laser beam to a corresponding one of the pair of the objective lenses 20a and 20b, and hence to a corresponding one of the recording layers 12a and 12b opposed to the objective lenses 20a and 20b, respectively.

Further, also in this embodiment, the pair of inclined stationary mirrors 18a and 18b, the pair of quartered detectors 22a and 22b and the objective lenses 20a and 20b in one of the extended end portions of the arm members 14a, 14b and 14c are aligned with corresponding optical elements in another extended end portion along the axis-of-rotation A of the optical disks 12.

Modification of the Fourth Embodiment

Figure 8A:
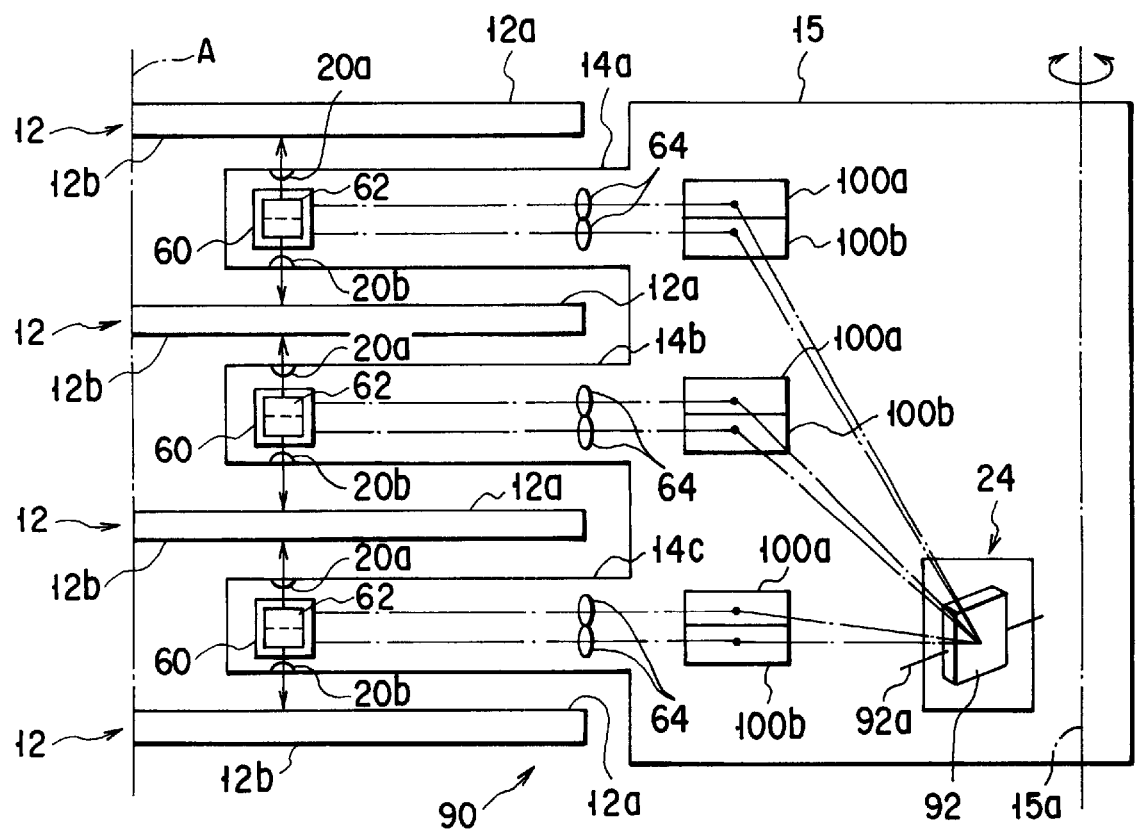
FIG. 8A is a schematic longitudinal sectional view illustrating an optical pick-up apparatus according to a modification of the fourth embodiment of the invention.
Figure 8B:
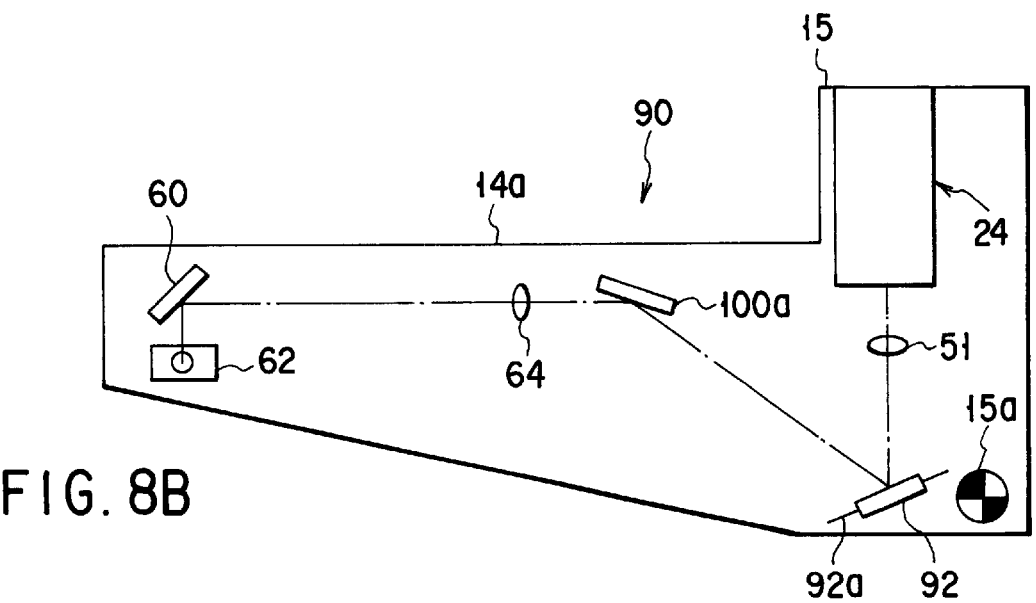
FIG. 8B is a schematic horizontal sectional view illustrating the optical pick-up apparatus of FIG. 8A.

FIG. 8A is a schematic longitudinal sectional view illustrating an optical pick-up apparatus 90 according to a modification of the fourth embodiment of the invention; and FIG. 8B is a schematic plan view illustrating the optical pick-up apparatus 90 of FIG. 8A according to the modification of the fourth embodiment.

In the modification of the fourth embodiment, structural elements similar to those employed in the second embodiment described with reference to FIGS. 5A to 5C are denoted by corresponding reference numerals, and no detailed description will be given thereof.

Also in this modification, a laser beam is emitted from the light beam emitting/receiving unit 24 in a substantially horizontal direction along the recording layers 12a and 12b of the optical disks 12. This beam is directed to a movable mirror 92 located at the same level as the proximal end of the arm member 14c which is the lowest one of the arm members 14a, 14b and 14c. The movable mirror 92 has an axis-of-rotation 92a extending parallel to the horizontal direction, and is adapted to swing a laser beam from the light beam emitting/receiving unit 24 in the vertical direction along the axis-of-rotation A of the optical disks 12. In this modification, the movable mirror 92 is a galvano mirror.

Plural pairs of stationary mirrors 100a and 100b are provided corresponding to the proximal ends of the arm members 14a, 14b and 14c. Each pair of stationary mirrors 100a and 100b are arranged vertically adjacent to each other along the axis-of-rotation A of the optical disks 12, and are directed horizontal. The movable mirror 92 selectively directs a laser beam from the light beam emitting/receiving unit 24, to one of the plural pairs of stationary mirrors 100a and 100b.

Each of the pair of stationary mirrors 100a and 100b reflects the laser beam from the movable mirror 92, to an inclined stationary mirror 60 located in each of the extended end portions of the arm members 14a, 14b and 14c, via a corresponding one of imaging lenses 64 provided for each of the arm members.

Each of the arm members 14a, 14b and 14c has two optical paths vertically arranged and extending from the movable mirror 92 through the pair of stationary mirrors 100a and 100b, respectively. A laser beam, which passes through the upper optical path, is reflected first by the inclined stationary mirror 60 then by the upper inclined reflection surface of a prism 62, and is then directed to the recording layer 12b provided on the lower surface of the optical disks 12, via the quartered detector 22a (see FIG. 5C) and the objective lens 20a which are located above the prism 62. A laser beam, which passes through the lower optical path, it is reflected first by the inclined stationary mirror 60 then by the lower inclined reflection surface of the prism 62, and is then directed to the recording layer 12a provided on the upper surface of the optical disks 12, via the quartered detector 22b (see FIG. 5C) and the objective lens 20b which are located below the prism 62. The structure of the optical circuit in the extended end portion of each of the arm members 14a, 14b and 14c is completely the same as that of the optical circuit employed in the extended end portion of each of the arm members 14a, 14b and 14c of the optical pick-up apparatus 50 according to the second embodiment, which was described with reference to FIGS. 5A, 5B and SC.

In the above-described optical pick-up apparatus 90 according to the modification of the fourth embodiment, the laser beam emitted from the light beam emitting/receiving unit 24 is selectively guided, by the movable mirror 90 opposed to the light beam emitting/receiving unit 24, to one of the two optical paths which are directed, via the pair of stationary mirrors 100a and 100b, respectively, to the stationary mirror 60 and the prism 62 located in the extended end portion of one of the arm members 14a, 14b and 14c. Further, the prism 62 directs the laser beam having passed through one of the two optical paths, to a corresponding one of the pair of the objective lenses 20a and 20b, and then to a corresponding one of the recording layers 12a and 12b opposed to the pair of objective lenses 20a and 20b, respectively.

It is preferable also in this modification that the optical path length from the light beam emitting/receiving unit 24 to the recording layer 12a or 12b via the corresponding objective lens 20a or 20b included in each of the arm members 14a, 14b and 14c, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the light beam emitting/receiving unit 24 can have the same optical characteristics.

Further, also in this modification, the inclined stationary mirror 60, the prism 62, the pair of quartered detectors 22a and 22b and the objective lenses 20a and 20b in one of the extended end portions of the arm members 14a, 14b and 14c are aligned with corresponding optical elements in another extended end portion along the axis-of-rotation A of the optical disks 12.

Fifth Embodiment

Figure 9A:
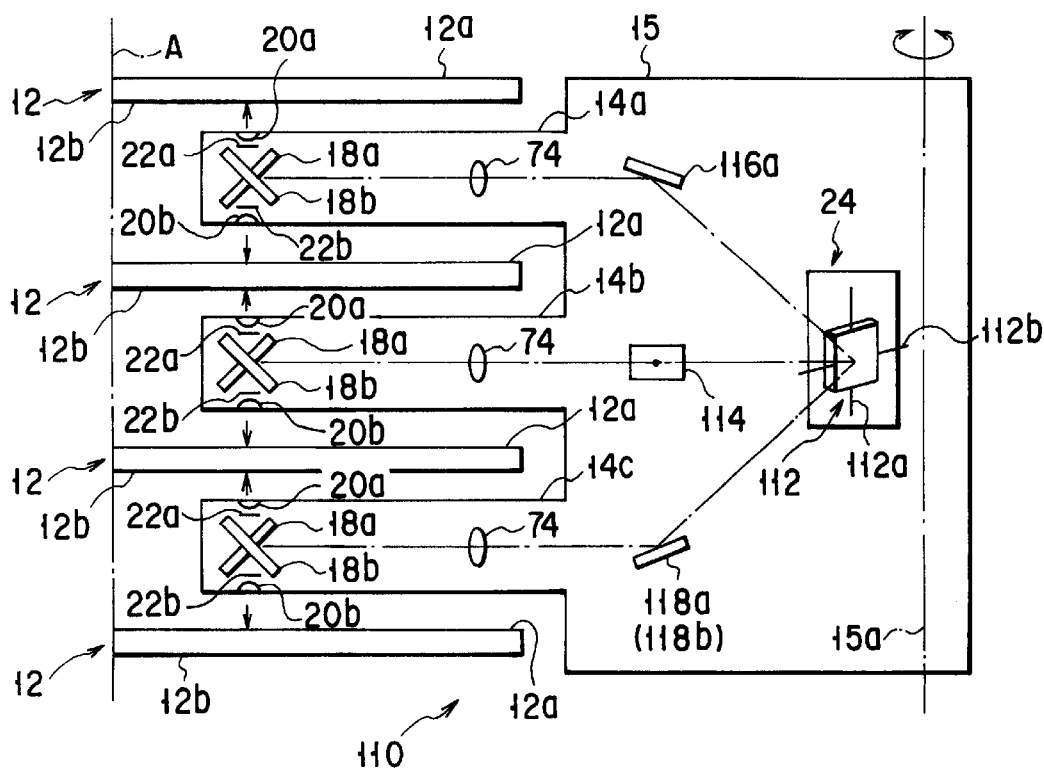
FIG. 9A is a schematic longitudinal sectional view illustrating an optical pick-up apparatus according to a fifth embodiment of the invention.
Figure 9B:
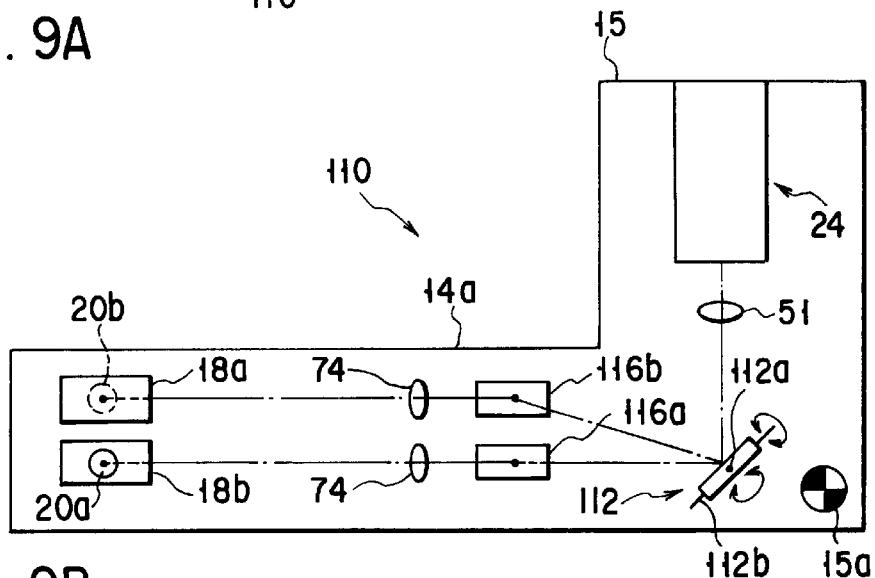
FIG. 9B is a schematic horizontal sectional view illustrating the optical pick-up apparatus of FIG. 9A.
Figure 9C:
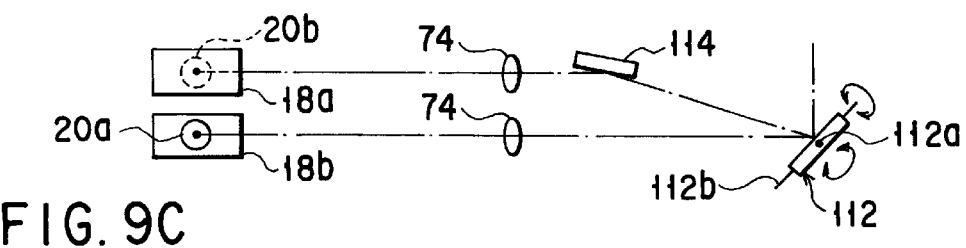
FIG. 9C is a more roughly schematic horizontal sectional view different from the horizontal sectional view of FIG. 9B, showing the optical pick-up apparatus of FIG. 9A.

FIG. 9A is a schematic longitudinal sectional view illustrating an optical pick-up apparatus 110 according to a fifth embodiment of the invention; FIG. 9B is a schematic horizontal sectional view illustrating the optical pick-up apparatus 110 of FIG. 9A; and:FIG. 9C is another schematic horizontal sectional view of the optical pick-up apparatus 110 of FIG. 9A.

In the fifth embodiment, structural elements similar to those employed in the first embodiment described with reference to FIGS. 1 to 4 are denoted by corresponding reference numerals, and no detailed description will be given thereof.

In this embodiment, a laser beam is emitted from the light beam emitting/receiving unit 24 via a relay lens 51 in a substantially horizontal direction along the recording layers 12a and 12b of the optical disks 12. This laser beam is directed to a galvano mirror 112 located at the same level as the proximal end of the arm member 14b which is the middle one of the arm members 14a, 14b and 14c. The galvano mirror 112 has a first axis-of-rotation 112a extending parallel to the axis-of-rotation A of the optical disks 12, and is adapted to vertically and horizontally swing a laser beam incident thereon.

The galvano mirror 112 selectively creates one of two optical paths which are directed to the extend end portion of the middle arm member 14b, when it swings about the first axis-of-rotation 112a by a predetermined distance. The two optical paths are horizontally separated from each other by a predetermined distance as shown in FIG. 9C.

One of the two optical paths directly linearly extends from the galvano mirror 112 to the extended end portion, while the other linearly extends to the extended end portion after being bent by a stationary mirror 114. When the laser beam from the galvano mirror 112 is guided through any one of the two optical paths, it passes through an imaging lens 74 and then reaches a corresponding one of a pair of inclined stationary mirrors 18a and 18b, which are horizontally located in the extended end portion of the arm member 14b with a predetermined distance therebetween. The pair of inclined stationary mirrors 18a and 18b incline in opposite directions. The corresponding one of the pair of inclined stationary mirrors 18a and 18b directs the laser beam to a corresponding one of the recording layers 12a and 12b of corresponding ones of the optical disks 12 via a corresponding one of the quartered detectors 22a and 22b and a corresponding one of the objective lenses 20a and 20b.

As is shown in FIGS. 9A and 9B, the galvano mirror 112 selectively directs the laser beam to one of a pair of stationary mirrors 116a and 116b which are horizontally located at the same level as the upper arm member 14a with a predetermined distance therebetween, when it swings about the first axis-of-rotation 112a and a second axis-of-rotation 112b by predetermined distances. The pair of stationary mirrors 116a and 116b are inclined toward the extended end portion of the upper arm member 14a.

One of the pair of stationary mirrors 116a and 116b directs the laser beam via the imaging lens 74, included in the upper arm member 14a to a corresponding one of a pair of inclined stationary mirrors 18a and 18b which are horizontally located with a predetermined distance therebetween in the extended end portion of the upper arm member 14a. The pair of inclined stationary mirrors 18a and 18b incline in opposite directions. The corresponding one of the pair of inclined stationary mirrors 18a and 18b directs the laser beam to a corresponding one of the recording layers 12a and 12b of corresponding ones of the optical disks 12 via a corresponding one of the quartered detectors 22a and 22b and a corresponding one of the objective lenses 20a and 20b.

Furthermore, as is shown in FIGS. 9A and 9B, the galvano mirror 112 selectively directs the laser beam to one of a pair of stationary mirrors 118a and 118b which are horizontally located at the same level as the lower arm member 14c with a predetermined distance therebetween, when it swings about the first axis-of-rotation 112a and the second axis-of-rotation 112b by predetermined distances. The pair of stationary mirrors 118a and 118b are inclined toward the extended end portion of the lower arm member 14c.

One of the pair of stationary mirrors 118a and 118b directs the laser beam via the imaging lens 74 included in the lower arm member 14c to a corresponding one of a pair of inclined stationary mirrors 18a and 18b which are horizontally located with a predetermined distance therebetween in the extended end portion of the lower arm member 14c. The pair of inclined stationary mirrors 18a and 18b incline in opposite directions. The corresponding one of the pair of inclined stationary mirrors 18a and 18b directs the laser beam to a corresponding one of the recording layers 12a and 12b of corresponding ones of the optical disks 12 via a corresponding one of the quartered detectors 22a and 22b and a corresponding one of the objective lenses 20a and 20b.

As described above, in this embodiment, a laser beam is guided by the single galvano mirror 112 to a desired one of the recording layers 12a and 12b of the optical disks 12 via a desired one of the objective lenses 20a and 20b of a desired one of the arm members 14a, 14b and 14c, as a result of only changing the swing angle of the single galvano mirror 112 about the first axis-of-rotation 112a and/or the second axis-of-rotation 112b, and using the functions of the aforementioned plural stationary mirrors for the arm members 14a, 14b and 14c. Thus, information can be recorded onto or reproduced from a desired recording layer using a laser beam reflected from the single galvano mirror 112.

When the optical pick-up apparatus 110 of the fifth embodiment which uses the galvano mirror 112 with the first and second axes-of-rotations 112a and 112b, as described above with reference to FIGS. 9A to 9C, is compared with the optical pick-up apparatus 70 of the third embodiment shown in FIGS. 6A and 6B, which performs similar operations to the optical pick-up apparatus 110 of the fifth embodiment, using the galvano mirror 78 which has only one axis-of-rotation 72a extending along the axis-of-rotation A of the optical disks 12, the number of stationary mirrors required in the former apparatus from the galvano mirror 112 to a desired one of the objective lenses 20a and 20b of a desired one of the arm members 14a, 14b and 14c is smaller, and accordingly the size of the housing when seen in plan view is also smaller than in the case of the latter apparatus.

It is preferable also in this embodiment that the optical path length from the light beam emitting/receiving unit 24 to the recording layer 12a or 12b via the corresponding objective lens 20a or 20b included in each of the arm members 14a, 14b and 14c, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the light beam emitting/receiving unit 24 can have the same optical characteristics.

Further, also in this embodiment, the pair of inclined stationary mirrors 18a and 18b, the pair of quartered detectors 22a and 22b and the objective lenses 20a and 20b in one of the extended end portions of the arm members 14a, 14b and 14c are aligned with corresponding optical elements in another extended end portion along the axis-of-rotation A of the optical disks 12.

Figure 10A:
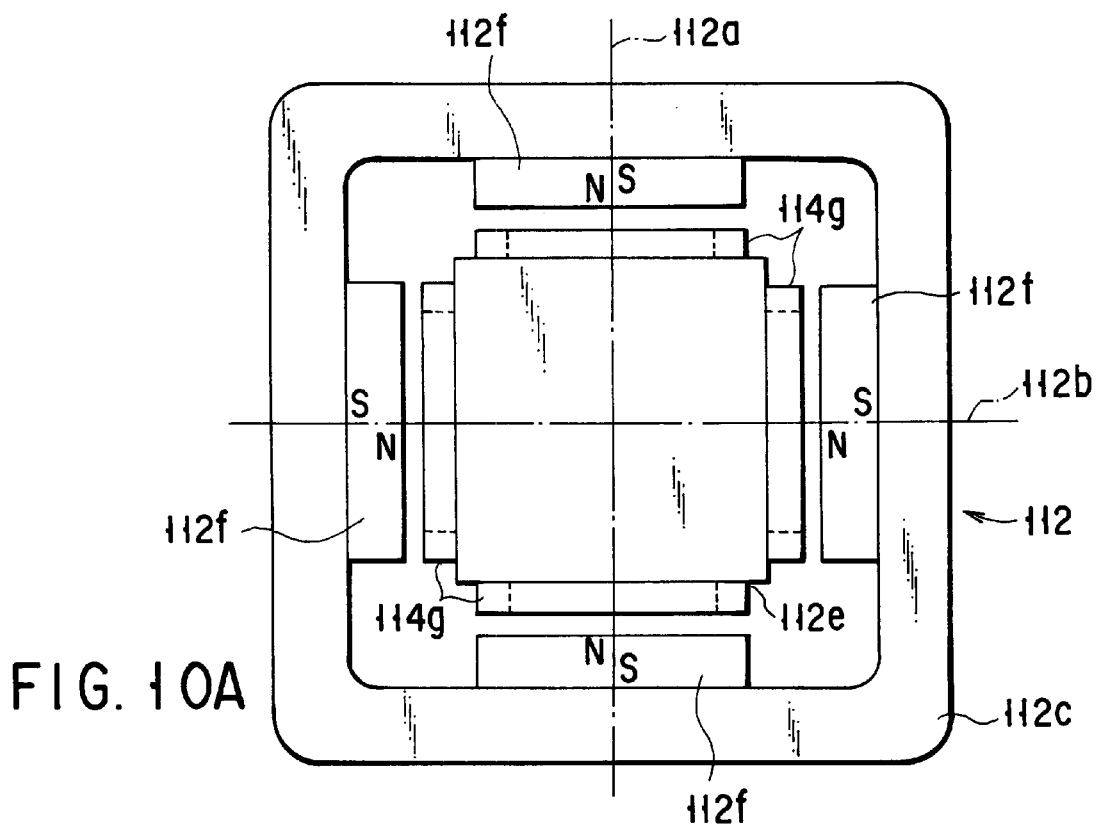
FIG. 10A is a schematic front view illustrating a biaxial galvano mirror, a kind of biaxial movable mirror, employed in the optical pick-up apparatus of the fifth embodiment shown in FIGS. 9A to 9C.
Figure 10B:
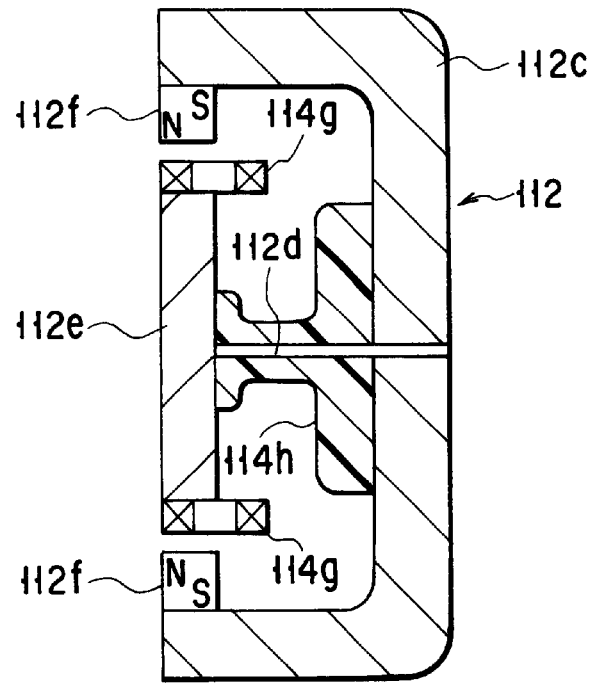
FIG. 10B is a schematic longitudinal sectional view of the biaxial galvano mirror of FIG. 10A.

FIG. 10A is an enlarged front view of the galvano mirror 112 which has the first and second axes-of-rotation 112a and 112b; and FIG. 10B is an enlarged longitudinal sectional view of the galvano Mirror 112 of FIG. 10A.

The galvano mirror 112 comprises a cubic outer frame 112c, a mirror support member 112e located in the central opening of the outer frame 112c and supported by an elastic member 112d like a bar spring fixed on the center of a wall which constitutes the bottom of the central opening, four magnets 112f fixed on the four sides of the inner peripheral surfaces of the outer frame 112c, and four coils 114g provided on those four portions of the outer peripheral surfaces of the mirror support member 112e which are opposed to the four magnets 112f. A damping material 114h is attached to the periphery of the elastic member 112d between the bottom wall of the central opening of the outer frame 112c and the bottom wall of the mirror support member 112e.

The galvano mirror 112 constructed as above can be swung through a desired swing angle about the first axis-of-rotation 112a by controlling the intensity and direction of a current to be flown into a pair of coils 114g located in the direction of the second axis-of-rotation 112b, while it can be swung through a desired swing angle about the second axis-of-rotation 112b by controlling the intensity and direction of a current to be flown into another pair of coils 114g located in the direction of the first axis-of-rotation 112a.

Sixth Embodiment

Figure 11:
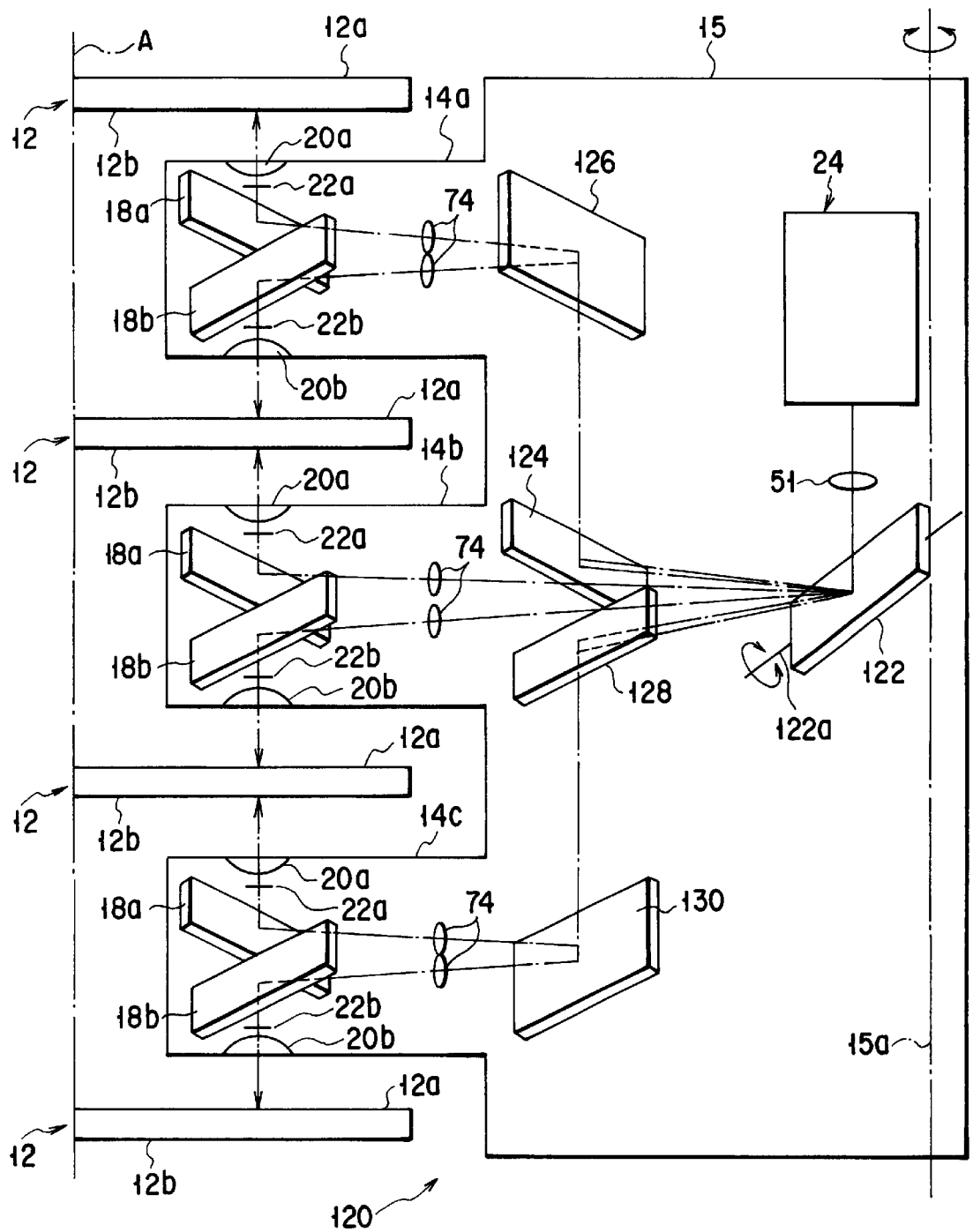
FIG. 11 is a schematic longitudinal sectional view illustrating an optical pick-up apparatus according to a sixth embodiment of the invention.

FIG. 11 is a schematic longitudinal sectional view of an optical pick-up apparatus 120 according to a sixth embodiment of the invention.

In the sixth embodiment, structural elements similar to those employed in the first embodiment described with reference to FIGS. 1 to 4 are denoted by corresponding reference numerals, and no detailed description will be given thereof.

In this embodiment, a laser beam is downwardly emitted from the light beam emitting/receiving unit 24 along the axis-of-rotation A of the optical disks 12. This laser beam is directed to a galvano mirror 122 located at the same level as the proximal end of the arm member 14b which is the middle one of the arm members 14a, 14b and 14c. The galvano mirror 122 has an axis-of-rotation 122a extending along the axis-of-rotation A of the optical disks 12, and is adapted to horizontally swing a laser beam incident thereon.

The galvano mirror 122 selectively creates one of two optical paths which are directed to the extend end portion of the middle arm member 14b and horizontally separated from each other by a predetermined distance. When the laser beam from the galvano mirror 122 is guided through any one of the two optical paths, it passes through an imaging lens 74 in the middle arm member 14b and then reaches a corresponding one of a pair of inclined stationary mirrors 18a and 18b, which are horizontally located in the extended end portion of the arm member 14b with a predetermined distance therebetween. The pair of inclined stationary mirrors 18a and 18b incline in opposite directions. The laser beam is then guided by a corresponding one of the pair of inclined stationary mirrors 18a and 18b to a corresponding one of the recording layers 12a and 12b of corresponding ones of the optical disks 12 via a corresponding one of the quartered detectors 22a and 22b and a corresponding one of the objective lenses 20a and 20b.

As shown in FIG. 11, the galvano mirror 122 also selectively creates one of two optical paths which are directed to a single first stationary mirror 124 located on one side of the proximal end of the middle arm member 14b in the horizontal direction. The single first stationary mirror 124 inclines upward for the upper arm member 14a. A single second stationary mirror 126 is provided above the single first stationary mirror 124 as the same level as the upper arm member 14a, and inclines toward the extended end portion of the upper arm member 14a.

Any selected one of the optical paths from the galvano mirror 122 to the single first stationary mirror 124 further extends from the first stationary mirror 124 to the single second stationary mirror 126. Any one of the two optical paths extends from the single second stationary mirror 126 via an imaging lens 74 in the upper arm member 14a to a corresponding one of a pair of inclined stationary mirrors 18a and 18b which are horizontally located with a predetermined distance therebetween in the extended end portion of the upper arm member 14a. The pair of inclined stationary mirrors 18a and 18b incline in opposite directions. The corresponding one of the pair of inclined stationary mirrors 18a and 18b directs the laser beam to a corresponding one of the recording layers 12a and 12b of corresponding ones of the optical disks 12 via a corresponding one of the quartered detectors 22a and 22b and a corresponding one of the objective lenses 20a and 20b.

As shown in FIG. 11, the galvano mirror 122 further selectively creates one of two optical paths which are directed to a single third stationary mirror 128 located on the other side of the proximal end of the middle arm member 14b in the horizontal direction. The single third stationary mirror 128 inclines downward for the lower arm member 14c.

A single fourth stationary mirror 130 is provided below the single third stationary mirror 128 as the same level as the lower arm member 14c, and inclines toward the extended end portion of the lower arm member 14c.

Any selected one of the optical paths from the galvano mirror 122 to the single third stationary mirror 128 further extends from the third stationary mirror 128 to the single fourth stationary mirror 130. Any one of the two optical paths extends from the single fourth stationary mirror 130 via an imaging lens 74 in the lower arm member 14c to a corresponding one of a pair of inclined stationary mirrors 18a and 18b which are horizontally located with a predetermined distance therebetween in the extended end portion of the lower arm member 14c. The pair of inclined stationary mirrors 18a and 18b incline in opposite directions. The corresponding one of the pair of inclined stationary mirrors 18a and 18b directs the laser beam to a corresponding one of the recording layers 12a and 12b of corresponding ones of the optical disks 12 via a corresponding one of the quartered detectors 22a and 22b and a corresponding one of the objective lenses 20a and 20b.

As described above, in this embodiment, a laser beam is guided by the single galvano mirror 122 to a desired one of the recording layers 12a and 12b of the optical disks 12 via a desired one of the objective lenses 20a and 20b of a desired one of the arm members 14a, 14b and 14c, as a result of only changing the swing angle of the single galvano mirror 122, and using the functions of the aforementioned plural stationary mirrors for the arm members 14a, 14b and 14c. Thus, information can be recorded onto or reproduced from a desired recording layer using a laser beam reflected from the single galvano mirror 72.

It is preferable also in this embodiment that the optical path length from the light beam emitting/receiving unit 24 to the recording layer 12a or 12b via the corresponding objective lens 20a or 20b included in each of the arm members 14a, 14b and 14c, and the arrangement of the optical elements along the optical paths should be set so that laser beams guided to the recording layers 12a and 12b via the respective objective lenses 12a and 12b can have the same optical characteristics, and so that reflected laser beams returned from the recording layers 12a and 12b to the light beam emitting/receiving unit 24 can have the same optical characteristics.

Further, also in this embodiment, the pair of inclined stationary mirrors 18a and 18b, the pair of quartered detectors 22a and 22b and the objective lenses 20a and 20b in one of the extended end portions of the arm members 14a, 14b and 14c are aligned with corresponding optical elements in another extended end portion along the axis-of-rotation A of the optical disks 12.

Although the above-described optical pick-up apparatuses of the various embodiments record information onto or reproduce information from a recording layer of an optical disk such as a CD (Compact Disk) or a DVD (Digital Video Disk) as a result of radiating the recording layer of the optical disk with a light beam via an objective lens opposed to the recording layer, they can be used to record information onto or reproduce information from a recording layer of an optical disk by further converging a light beam from the objective lens using a solid immersion lens as known from Japanese Patent Application KOKAI Publication No. 5-189796, before radiating the recording layer of the optical disk with the light beam.

Such a technique of optically recording/reproducing information as using a combination of an objective lens and a solid immersion lens is known from, for example, "Nikkei Byte", September 1997 or "Nikkei Electronics", Sep. 22, 1997. The objective lens and the solid immersion lens are mounted on a slider which will float above the surface of the recording layer of the optical disk due to a wind occurring in accordance with the rotation of the optical disk, as in the case of the magnetic head of the conventional magnetic hard disk. The slider floats substantially 100 nm to 150 nm above the recording layer. The conventional optical recording/reproducing method in which the optical head is separated by 1 mm or more from the surface of the optical disk such as the CD or the DVD is referred to as "Far Field Recording", while the optical recording/reproducing method using the aforementioned floating-type combination of the solid immersion lens and the objective lens is referred to as "Near Field Recording". In the near field recording, a laser beam to be used to record or reproduce information can be made to have a spot size substantially one tenth that of a laser beam used in the far field recording. Accordingly, the recording density in the near field recording can be substantially ten times that in the far field recording.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept at defined by the appended claims and their equivalents.

What is claimed is:

1. An optical pick-up apparatus which optically performs at least one of selective recording of information onto a plurality of recording layers of an optical recording medium, and selective reproduction of information from the plurality of recording layers, comprising:

optical circuits which are each adapted to guide a light beam to a desired recording layer using a movable mirror, to thereby perform selective recording of information onto the plurality of recording layers of the optical recording medium or selective reproduction of information from the plurality of recording layers, wherein a plurality of optical recording mediums are arranged in layers, and the movable mirror selectively guides a light beam between each pair of adjacent ones of the optical recording mediums arranged in layers, and another movable mirror which is provided between said each pair of the adjacent optical recording mediums and selectively guides the light beam selectively guided by the first-mentioned movable mirror, to one of two recording layers opposed to each other and provided on said each pair of the adjacent optical recording mediums.

2. An optical pick-up apparatus according to claim 1, wherein the movable mirror has inclination angle detecting means.

3. An optical pick-up apparatus according to claim 1, wherein said another movable mirror is a galvano mirror.

4. An optical pick-up apparatus which optically performs at least one of selective recording of information onto a plurality of recording layers of a plurality of optical recording mediums arranged in layers, and selective reproduction of information from the plurality of recording layers, wherein a plurality of reflection mirrors corresponding to the plurality of recording layers of the plurality of optical recording mediums are provided such that they are separated from each other in a direction of alignment of the plurality of optical recording mediums and in a direction parallel to the surfaces of the optical recording mediums, switching in optical circuits which are each adapted to guide a light beam to that one of the reflection mirrors arranged in the direction parallel to the surfaces, which corresponds to a desired recording layer, is performed using a movable mirror to thereby perform, via the plurality of reflection mirrors, selective recording of information onto the plurality of recording layers of the optical recording mediums or selective reproduction of information from the plurality of recording layers, and the corresponding reflection mirror included in the plurality of reflection mirrors arranged in the direction parallel to the surfaces is adapted, if necessary, to further guide the light beam to that one of the reflection mirrors separated in the direction of alignment, which corresponds to a desired recording layer, and wherein the optical circuits include two objective lenses which are provided in a space between each pair of adjacent ones of the optical recording mediums arranged in layers, and are opposed to opposed two recording layers of said each pair of adjacent optical recording mediums, the two objective lenses being separated from each other in the direction parallel to the surfaces for guiding, to a corresponding recording layer, a light beam selectively guided thereto from the movable mirror via a corresponding reflection mirror.

5. An optical pick-up apparatus according to claim 4, wherein the two objective lenses provided in the space between said each pair of adjacent ones of the optical recording mediums arranged in layers are coaxial with two objective lenses provided in another space in the direction of alignment.

6. An optical pick-up apparatus which uses a light beam to perform optically at least one of recording of information onto a selective one of a plurality of recording layers of an optical recording medium, and reproduction of information from a selective one of the plurality of recording layers, the optical recording medium having a plurality of recording discs arranged in parallel to each other with supporting gaps therebetween, the recording layers being mounted on top and bottom surfaces of the discs, and one of the top and bottom surfaces of one disc facing with a gap the other of the top and bottom surfaces of another disc located adjacent to the one disc, the apparatus comprising:
a movable mirror; and
light beam transmitting elements provided in each of the gaps, wherein, when the light beam is projected on the movable mirror, the movable mirror reflects the light beam toward a selected one of the gaps to guide the light beam by means of the light beam transmitting elements in the selected one gap to a desired one of the recording layers on the side surfaces of adjacent two discs facing each other, and to perform selective recording of informing onto the desired one of the recording layers or selective reproduction of information from the desired one of the recording layers.

7. An optical pick-up apparatus which uses a light beam to perform optically at least one of recording of information onto a selective one of a plurality of recording layers of an optical recording medium, and reproduction of information from a selective one of the plurality of recording layers, the optical recording medium having a plurality of recording discs arranged in parallel to each other with supporting gaps therebetween, the recording layers being mounted on a side of each first and second surfaces of each disc onto the first surface light beam incident from the top surface of each disc being projected, onto the second surface light beam incident from the bottom surface of each disc being projected, and one of top and bottom surfaces of one disc facing with a gap the other of top and bottom surfaces of another disc located adjacent to the one disc, the apparatus comprising:
a movable mirror; and
light beam transmitting elements provided in each of the gaps, wherein, when the light beam is projected on the movable mirror, the movable mirror reflects the light beam toward a selected one of the gaps to guide the light beam by means of the light beam transmitting elements in the selected one gap to a desired one of the recording layers on the side surfaces of adjacent two discs facing each other, and to perform selective recording of informing onto the desired one of the recording layers or selective reproduction of information from the desired one of the recording layers.

\* \* \* \* \*